April 25, 1933.                L. H. CLARK                1,905,806
                                 FILTER
                           Filed Feb. 24, 1928
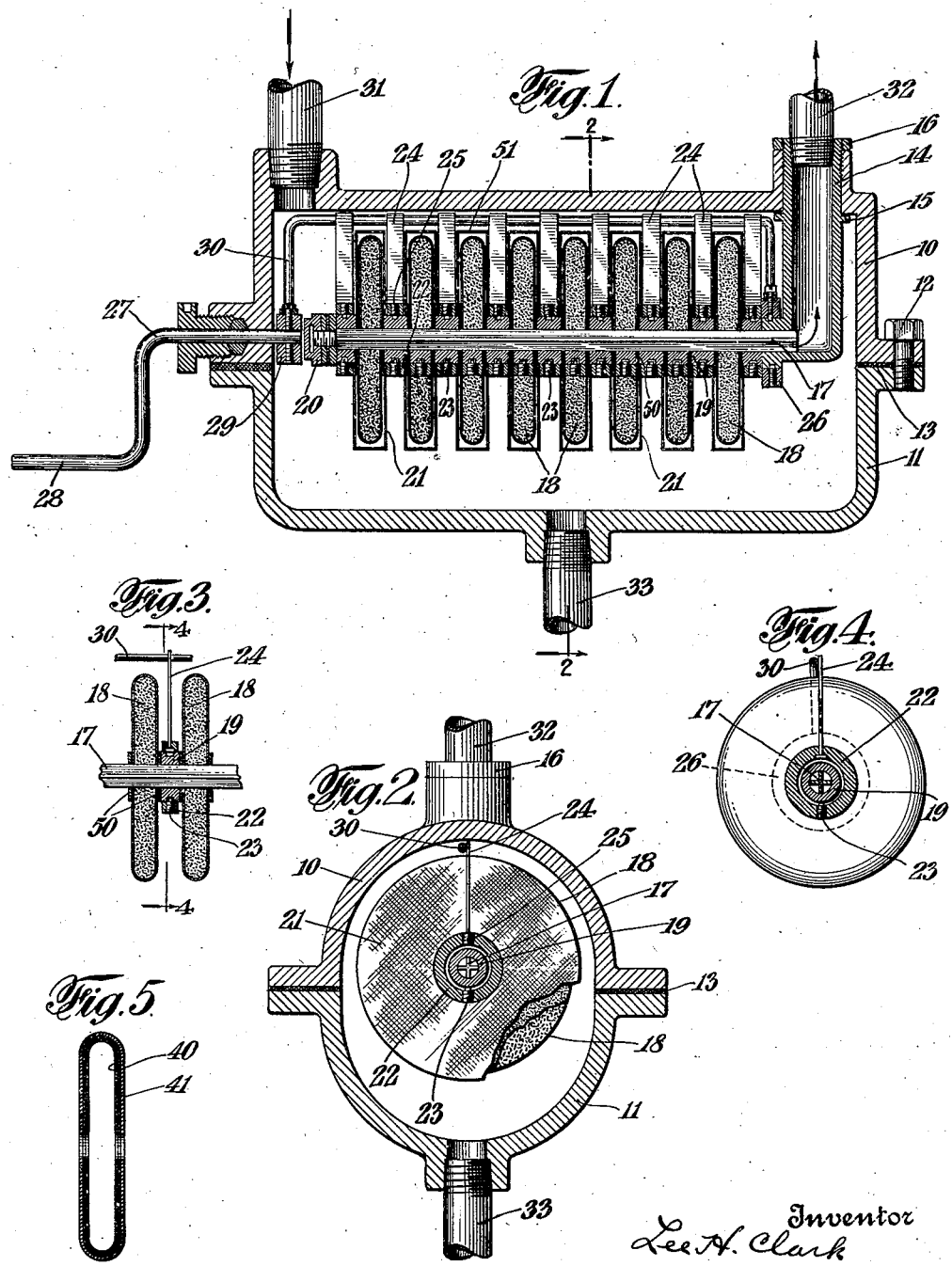

Patented Apr. 25, 1933

1,905,806

UNITED STATES PATENT OFFICE

LEE H. CLARK, OF HAVERFORD, PENNSYLVANIA, ASSIGNOR TO THE SHARPLES SPECIALTY COMPANY, OF PHILADELPHIA, PENNSYLVANIA, A CORPORATION OF DELAWARE

FILTER

Application filed February 24, 1928. Serial No. 256,554.

This invention relates to filters and particularly to filters embodying a filtering element of the ultra filter type.

The general characteristics and purposes of ultra filters and the results generally obtainable by the use thereof are known to some extent, as are also the composition of such elements and the variations in the filtering effect thereof obtained by controlling some of the characteristics of the elements. It is intended that in the practice of this invention advantage may be taken of what is known with respect to ultra filters and that what is herein described is to be considered in the light of what is known and may be modified or applied, within the spirit of my invention, in the light of what is known with respect to the uses and composition and variation of characteristics of ultra filtering elements.

An object of this invention is to provide a filter of the ultra filter type which is inexpensive to manufacture and which is durable and may be easily and quickly cleaned and which possesses large filtering area but occupies a small total volume and which may be modified in the light of prior knowledge as to the structure and use and composition and mode of forming the filtering element.

In the practice of my invention the filtering element preferably comprises a membrane composed of ultra filtering material such as, for example, collodion, gelatine hardened with formaldehyde or silica precipitated from sodium silicate by an acid, or other material of similar properties.

An important feature of my invention resides in the production and employment of an ultra filtering element in such relation to a support therefor that a filter having a filtering surface of relatively great extent may be made to occupy but a relatively small volume. In this connection the support is so constituted that relatively high pressures may be employed without destruction of the membrane and liquids passing through the membrane may flow away in order that continuous filtration may be carried out. Also in this connection the membrane is advantageously in the form of an envelope that contains the support but is provided with passages for the egress of liquid passing from the outside of the envelope-like filtering element to the inside thereof in the filtering operation. Thus, a filtering unit embodying and made in accordance with my invention may take the form of a supporting member of any desirable configuration and volume which is enclosed by and supports the filtering element, the supporting member being of such construction as to permit relatively free flow of liquid passing through the filtering element and the filtering element having an opening acting in conjunction with suitable liquid conducting means for the withdrawal from the interior of the element of liquid that has passed into it from the outside. Any number of such units may be employed together. The support may be a hollow perforated or porous structure of metal or of naturally or synthetically formed material, it being preferable to support such a hollow structure internally against pressure that may be employed in the filtering operation. Thus the support may be formed of wire gauze or perforated metal with suitable supports to prevent collapse, or it may be a hollow or solid body of naturally or synthetically formed porous material, it being possible to use a solid body encased in wire gauze or any other structure that will permit filtered liquid to flow away while supporting the membrane against external pressure. The important functions of the support being to support the filtering element against external pressure and to permit the flowing away of filtered liquid, it is only necessary that the surface of the support be of such character as to permit flow of liquid, although the entire support may be porous, and it is in that sense that the term "porous" is used herein with respect to the support for the filtering element.

Inasmuch as the filtering elements are usually in the form of an envelope in accordance with my invention I propose that such filtering elements be formed upon their supports as by dipping the supports in a solution of the substance of which the filtering elements are composed.

If it be desired that the filtering element or membrane shall have uniform thickness, and such a condition is generally desirable, particularly where a high filtering capacity per unit area is sought, a membrane of uniform thickness may be produced in accordance with my invention by first coating or impregnating the support with a material that is not acted upon by the solvent of the membrane but produces a smooth or uniform surface upon which the membrane may be formed with a uniform thickness by merely dipping the supports as above described. In some instances it is desirable to reenforce the filter membrane by embodying a fabric or wire cloth therein, and in such case the reenforcing member may be arranged over the support before the dipping operation. After the dipping operation the membrane may be set to a jelly and the material used for imparting a smooth surface to the support may be removed by dissolving it or melting it or by both operations. In a filter made in accordance with my invention the units conveniently take the form of a disk having a central aperture, the membrane enclosing and being supported by the disk which is porous in the sense above described. The internal surface of the central aperture is not enclosed by the membrane and provides for the withdrawal of filtrate from the interior thereof. Any desired number of disk-shaped or other units may be so mounted that the filtrate is withdrawn through a common channel and led from the casing that encloses the disks and into which is fed the substance to be filtered. Advantageously a space is left around each unit and means is provided for dislodging or agitating sludge or the like that surrounds or adheres to the external surfaces of the membranes. The membranes are preferably cleaned by a reverse flow of a clear suitable liquid; and advantageously pervious or perforated members overlie or surround the membranes to support them during such reverse flow and to protect them from the sludge-dislodging means.

Other objects, novel features and advantages of this invention will be set forth in this description of my invention or will be apparent in the light thereof.

While I illustrate and describe my invention chiefly in connection with a support composed of naturally or synthetically formed porous material, it is to be understood that it is not limited to the use thereof and that such material is mentioned as an example of material that may be used in a membrane support that is porous in the sense herein defined.

In the drawing,

Fig. 1 is a vertical section through a filter embodying the invention;

Fig. 2 is a section on the line 2—2 of Fig. 1;

Fig. 3 is a vertical section corresponding to Fig. 1 of a portion of the filter with a modified cleaner;

Fig. 4 is a section on the line 4—4 of Fig. 3; and

Fig. 5 is a sectional view of a modification.

In the embodiment of my invention shown in the drawing the filter casing comprises the upper and lower sections 10 and 11 which are connected one to the other by means of bolts 12 or the like (only one of which is shown), there being a gasket 13 interposed between the coacting flanges of the two sections. A conduit 14 extends through the top of section 10 and is provided with shoulder 15 which abuts the under surface thereof. This conduit is held in place by means of nut 16 threaded onto its outer end and bearing against the upper end of a boss extending upwardly from section 10. The lower end of the conduit terminates in an elbow in which is arranged one end of supporting rod 17 which is of cruciform cross-section. Upon this rod 17 are supported a plurality of filtering units 18.

Each filtering unit 18 includes a "porous" support and a filtering membrane, and in the embodiment of my invention illustrated in Figs. 1 to 4 each unit comprises a plate of naturally or synthetically formed porous material, the surface of which is enclosed by an ultra filter membrane, and which is provided with a central aperture through which passes the rod 17. Because of the cruciform cross-section of the rod 17 there are provided a plurality of channels by means of which filtered liquid may pass from the interiors of the filtering units to the discharge or outlet conduit 14. Between adjacent filtering units are provided spacers 19 and a cap 20 threaded on the end of the rod 17 holds the units in place thereon. Preferably gaskets 50 are located between spacers 19 and the membranes. A disk-like screen 21 of wire cloth or the like may be provided adjacent each surface of a filtering unit to protect the membrane and support it during the cleaning of the filter. In this connection the space between disks 21 may be bridged by ring-like screen members 51. A collar 22 is mounted on each spacer 19 and is provided with a set screw 23 fitting in a peripheral groove in the spacer. To each collar is attached a scraper 24 by means of a bolt or the like 25. A similar collar 26 is mounted on the end of the elbow in the conduit 14 and in the opposite end of the section 10 is rotatably mounted a shaft 27 having a crank handle 28. On the inner end of the shaft 27 is firmly attached a collar 29. A bail 30 has its end connected to the collars 26 and 29 and engages the outer ends of the fingers 24. Thus when the shaft 27 is rotated by means of the handle 28, bail 30 engages the ends of the fingers 24 and rotates them about spacers 19. In so doing the sludge, or the like, that may have collected on the surfaces of the various filtering units is removed and deposited in section 11 of the casing.

In the modification disclosed in Fig. 4, the cleaning finger is of less width than the distance between the opposed surfaces of adjacent filtering units, thus rendering unnecessary the screens 21 which are disclosed in Fig. 1. The width of the cleaning fingers used depends upon the character of the material filtered out from a fluid and the use of the screens 21 depends upon whether or not it is desirable to protect the filter membrane.

Liquid to be filtered is introduced into the casing through the inlet conduit 31 and is removed through the discharge conduit 14 communicating with the outlet pipe 32. From the interior of the casing the liquid passes through the pores of the filtering membrane on the surface of the porous plates, through the porous plates to the channels formed by the supporting member 17 and through these channels to the outlet conduit 14. A pipe 33 is provided in the bottom of section 11 to permit drainage of the enclosing casing. To clean the membranes some of the filtrate or any other suitable clear liquid miscible with the filtrate or a gas is passed into pipe 32 and withdrawn from the casing by pipe 31 or pipe 33.

The filtering units may comprise plates composed of naturally or synthetically formed porous material such as certain natural stone formations or small sized particles bonded together artificially. A manufactured material, known commercially as Filtros, is well suited for such plates. It is desirable that the filtering membrane be of uniform thickness since the pore size and membrane thickness are the controlling factors in the rate of filtration. Should the membrane be allowed to enter the pores of the plate it would be of uneven thickness and accordingly the diameter and length of the pores in the membrane would be difficult to control. Preferably gelatine is used as the material for impregnating or coating the porous plate to give it a uniform surface prior to forming the membrane thereon. Having formed a smooth surface on the plates, a number of them may be placed upon a rod in such a way as to prevent the formation of membrane over the inner surface of the aperture through the plate. The rod with the plate, with or without a reenforcing fabric overlying them, is then dipped into the membrane-forming solution. After dipping in the membrane-forming solution the plates are lifted out and may be revolved slightly to obtain even distribution of the solution over the surface of the plate. The filter membrane is then set or gelatinized. For example, if the filter membrane is of collodion and the solvent for the collodion is glacial acetic acid, the plate may be plunged into water. If the membrane is composed of other substances the treatment of course will be different but in any event the membrane will be gelatinized. When gelatine is used as the plate-surfacing material it is leached out with hot water. Fluid used for cleaning the membranes by back flow therethrough must not be a solvent for the membranes but it may be a solvent for the impurities deposited on the filter surface.

The plates or other supports for the membrane need not be of any particular composition so long as they sufficiently support the membrane and permit withdrawal of filtrate and are in that sense porous. Thus in Fig. 5 there is shown a unit in which the support is formed of one or more layers of perforated material or wire gauze 40 which will permit flow of filtrate, and the unit may include a reenforcing member 41 of any construction that will prevent collapse of the porous layer or layers of the support. In such case the membrane may be spread over the perforated material or wire gauze by relying upon surface tension to give a membrane of relatively uniform thickness, rotation of the support being resorted to if necessary for spreading the solution of filtering membrane, or the interstices of the perforated material or gauze may be filled as above described prior to forming the membrane on the support. The surfacing material used, while preferably gelatine because that is readily leached out with hot water, may be some other substance not acted upon by the solvent of the membrane-forming material. The filtering membrane preferably does not adhere to the support but preferably loosely encloses it and is supported by it. Inasmuch as the membrane is formed upon the support by dipping the support, which preferably is previously caused to have a smooth surface by the application of surfacing material, the membrane will smoothly overlie the support and closely fit it, and since the surfacing material prevents the membrane solution from entering the pores or interstices of the surface of the support, the membrane material will not be interlaced with the surface of the support and will not be joined to the support but will loosely engage it. And inasmuch as the membrane closely fits the support, all parts of the membrane will be supported by the support.

I claim:

1. A filter comprising a porous support having a rigid surface and a filtering membrane loosely enclosing and supported by said support and directly engaging and smoothly overlying the surface thereof.

2. A filter comprising a porous support having a rigid surface and a filtering membrane of uniform thickness loosely enclosing and supported by said support and directly engaging and smoothly overlying the surface thereof.

3. A filter comprising a plate of porous material having a rigid surface and a filtering membrane of uniform thickness loosely enclosing and supported by said plate and directly engaging and smoothly overlying the surface thereof.

4. A filter comprising a porous support having a rigid surface, a filtering membrane loosely enclosing and supported by said support and directly engaging and smoothly overlying the surface thereof, and fabric reenforcing said filtering membrane.

5. A filter comprising a porous support having a rigid surface, a filtering membrane of uniform thickness loosely enclosing and supported by said support and directly engaging and smoothly overlying the surface thereof and fabric reenforcing said filtering membrane.

6. In a filter a plurality of filtering units mounted on a common support and spaced from each other, each filtering unit comprising a porous support enclosed by and supporting a filtering membrane, protective screens for said membrane adjacent each face of a filtering unit and means movable over said screens for removing sludge or the like accumulated thereon.

7. In a filter a plurality of filtering units mounted on a common support and spaced from each other, each filtering unit comprising a porous support enclosed by and supporting a filtering membrane, protective screens for said membrane adjacent each face of a filtering unit, scrapers rotatable about said common support and over said protective screens and a common operating member for actuating said scrapers.

8. In a filter a plurality of filtering units mounted on a common support and spaced one from the other each filtering unit comprising a porous support enclosed by and supporting a filtering membrane, protective screens for said membrane adjacent each unit and means connecting together the screens for each unit.

9. In a filter, a filtering unit comprising a body of porous material and a filter membrane of uniform thickness enclosing said body and smoothly overlying the surface thereof, and a screen overlying said membrane adjacent each face of said body.

10. In a filter, a filtering unit comprising a body of porous material and a filter membrane of uniform thickness enclosing said body and smoothly overlying the surface thereof, a screen overlying said membrane adjacent each face of said body, and means connecting together said screens.

11. In a filter, a filtering unit comprising a porous plate enclosed by a filtering membrane and screens overlying said membrane adjacent each face of said unit.

12. In a filter, a plurality of filtering units mounted on a common support and spaced one from the other, each filtering unit comprising a porous support enclosed by a filter membrane and screens supported by said member adjacent each face of said units.

13. In a filter, a casing having a mixture inlet, a hollow outlet tube extending into said casing and fixed with respect to said casing, a member constituting a common support for filtering units and being supported by said tube, a plurality of filtering units mounted on said common support and spaced from each other and comprising a rigid surface, porous supporting member loosely enclosed by and supporting a filtering membrane directly engaging and smoothly overlying the surface of said member, scrapers rotatable about said common support and over the faces of said units, and a common operating member for operating said scrapers.

In testimony whereof, I have signed my name to this specification.

LEE H. CLARK.